(12) United States Patent
Miryanov et al.

(10) Patent No.: US 9,397,910 B2
(45) Date of Patent: *Jul. 19, 2016

(54) MARKING PROGRAM FILES AS BELONGING TO AN APPLICATION

(71) Applicant: Hewlett Packard Enterprise Development LP, Houston, TX (US)

(72) Inventors: Vitaly Miryanov, Bracknell (GB); Brindusa Kevorkian, San Diego, CA (US); Irina Miryanova, Bracknell (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/614,461

(22) Filed: Feb. 5, 2015

(65) Prior Publication Data

US 2015/0156091 A1    Jun. 4, 2015

Related U.S. Application Data

(63) Continuation of application No. 13/384,671, filed as application No. PCT/US2009/052452 on Jul. 31, 2009, now Pat. No. 8,959,205.

(51) Int. Cl.
| | |
|---|---|
| *G06F 15/173* | (2006.01) |
| *G06F 9/445* | (2006.01) |
| *H04L 12/26* | (2006.01) |
| *G06F 15/16* | (2006.01) |
| *G06F 9/44* | (2006.01) |

(52) U.S. Cl.
CPC ........ *H04L 43/08* (2013.01); *G06F 8/60* (2013.01); *Y10S 707/99954* (2013.01)

(58) Field of Classification Search
CPC ..... H04L 43/08; G06F 8/60; Y10S 707/99954
USPC ............. 709/224, 229; 707/999.203, E17.01; 717/122
See application file for complete search history.

(56) References Cited

U.S. PATENT DOCUMENTS 8,307,341 B2    11/2012    Eykholt
(Continued)

FOREIGN PATENT DOCUMENTS

| JP | 2009093251 A | 4/2009 |
|---|---|---|
| KR | 20090000076 A | 1/2009 |

(Continued)

OTHER PUBLICATIONS

International Searching Authority, The International Search Report and the Written Opinion, Mar. 31, 2010, 13 Pages.
"Perl Download Package" webpage on http://strawberry/perl.com, snapshot taken on Jun. 14, 2014 (1 page).
(Continued)

*Primary Examiner* — Wen-Tai Lin
(74) *Attorney, Agent, or Firm* — Trop, Pruner & Hu, P.C.

(57) ABSTRACT

A managed device is searched in a computer network and program files and an installed package are discovered on the managed device. A rule is applied to package properties of the installed package to create a normalized representation of the installed package.

20 Claims, 3 Drawing Sheets

(56) References Cited

U.S. PATENT DOCUMENTS

2005/0132350 A1 6/2005 Markley et al.
2006/0129601 A1 6/2006 Chang et al.
2006/0288055 A1 12/2006 Johnson et al.
2008/0148253 A1 6/2008 Badwe et al.
2008/0189326 A1 8/2008 Norrie
2009/0031286 A1 1/2009 Yee

FOREIGN PATENT DOCUMENTS

WO    WO-03090107 A1    10/2003
WO    WO-2008119610    10/2008

OTHER PUBLICATIONS

"Winzip Example Package", a snapshot taken on Jun. 14, 2014 on a Winzip file (1 page).

MARKING PROGRAM FILES AS BELONGING TO AN APPLICATION

CROSS REFERENCE TO RELATED APPLICATION

This is a continuation of U.S. application Ser. No. 13/384,671, filed Jan. 18, 2012, which is a national stage application under 35 U.S.C. §371 of PCT/US2009/052452, filed Jul. 31, 2009, both of which are hereby incorporated by reference.

BACKGROUND

A computer network is generally a group of interconnected computers and other devices, such as printers, external hard drives, modems, hubs, switches, bridges, routers, and so on. The network facilitates the computers to communicate with each other and also typically with external networks, such as the internet. Networks may be classified according to a wide variety of characteristics, such as the hardware and software technology used to interconnect the individual devices in the network.

A data center or datacenter is a facility used to house computer networks, computer systems and associated components, such as telecommunications and storage systems. It may include redundant or backup power supplies, redundant data communications connections, environmental controls (for example, air conditioning, fire suppression, etc.) and security devices. Datacenter design, construction, and operation may be in accordance with standard documents from accredited professional groups.

A datacenter can occupy one room of a building, one or more floors, or an entire building. The equipment in a data center may be in the form of servers mounted in cabinets. Other equipment such as mainframe computers and storage devices may be placed in the data center with the servers. Further, datacenters may also be used for off-site backups. For example, companies or users may subscribe to backup services provided by a data center.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

A computer network or datacenter will generally run software applications that handle business and operational data of an organization or other entities. Such software applications may be proprietary and developed internally by the organization, or purchased from enterprise software vendors, for example. Applications may include enterprise resource planning (ERP) systems, customer relationship management (CRM) systems, and the like. Often, these applications will be composed on multiple hosts, each running individual components, and with common components directed to databases, file servers, application servers, middleware, and various others. The applications may be distributed in a package, i.e., a series of executable and non-executable files contained within a database or other software container. The package may be installed by an operating system utility called a package manager.

An ERP system may be an organization-wide or company-wide computer software system used to manage and coordinate resources, information, and functions of a business from shared data stores, for example. In certain instances, the ERP system may have a service-oriented architecture with modular hardware and software units and "services" that communicate on a local area network, for example. The modular design may facilitate a business to add or reconfigure modules (perhaps from different vendors) while preserving data integrity in one shared database that may be centralized or distributed. Other applications may include word processing, spreadsheet, database, graphical, presentation, suite programs, and so on.

Accurate software discovery and inventory is generally an important part of the overall information technology (IT) infrastructure. It is typically beneficial to obtain a comprehensive, reliable, and normalized list of installed applications, for example, to maintain compliance with vendor or customer licensing agreements. Unfortunately, the application information readily available in the operating system may be incomplete, inconsistent, non-normalized, and inaccurate.

Inventory approaches, such as Discovery and Dependency Mapping (DDM) Inventory and the like, may utilize a file-based software application recognition algorithm that makes use of a software application library to recognize applications and to represent the inventoried results in a normalized form. However, maintenance of such a library may be a very resource intensive process.

Advantageously, exemplary embodiments of the present invention may enhance existing and new software application recognition algorithms to include a rule-based extension for discovery and recognition of software that has distributed and installed in a package format. In other words, as explained in more detail below, flexible rules are employed to inventory and normalize application files, reducing the size of the associated file library (and thus reduce time associated with populating the library). In all, the technique may significantly reduce the need to populate or, if population is needed, the time to populate a library with application data, as well as increase the application coverage, such as with UNIX platforms and other platforms.

Figure 1:
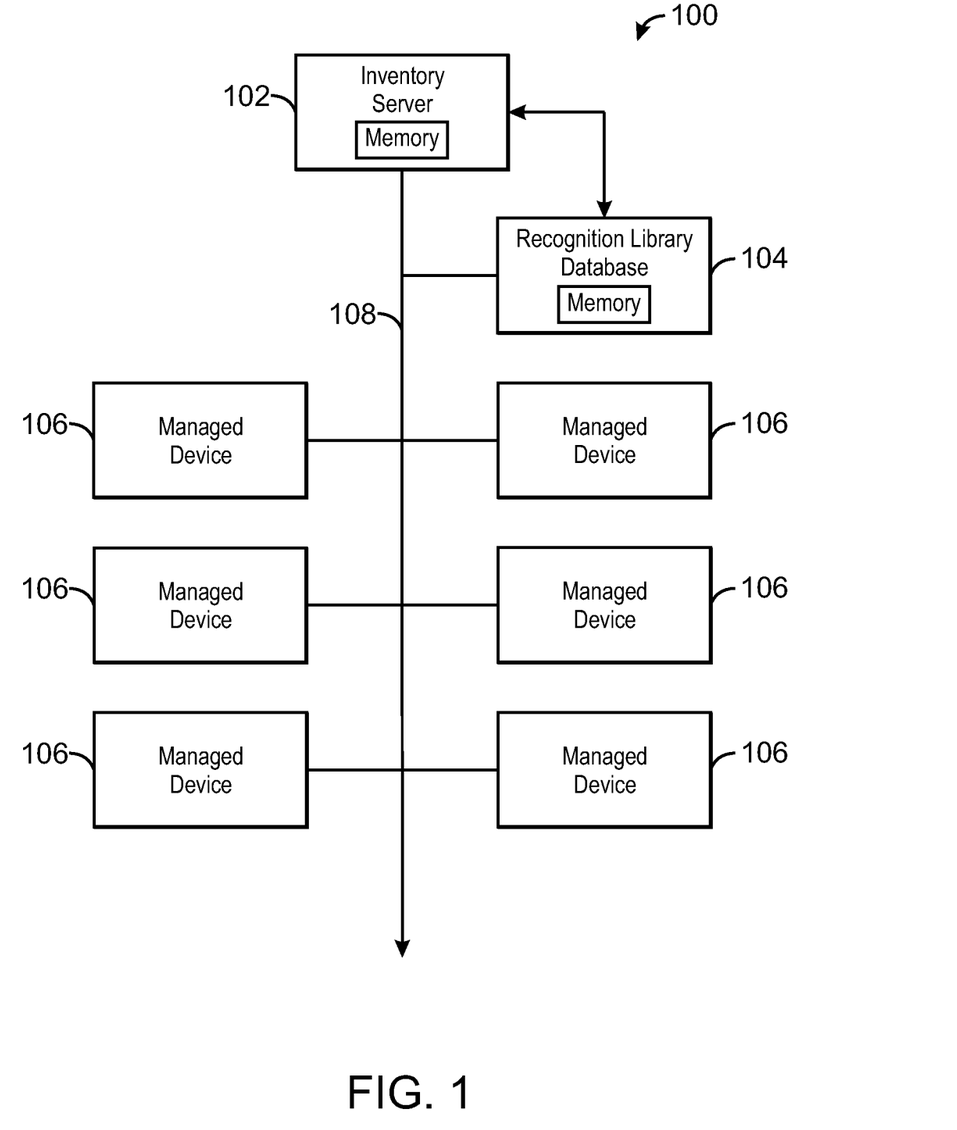
FIG. 1 is a diagrammatical representation of a computer network system having an inventory server in accordance with an exemplary embodiment of the present invention.

FIG. 1 is a computer network system 100 that stores in memory code configured to execute an application inventory system, in accordance with an exemplary embodiment of the present invention. The inventory server 102 and recognition library database 104 may store in memory code associated with package/file relationship information, file data, recognition rules, and file data normalization. In other embodiments this information may be stored in a database, a storage array, or any number of other storage options. It should be noted that the recognition library database 104 may be part of the inventory server 102. In the system 100, managed devices 106 (for example, servers, computers, laptops, printers, scanners, etc.) are coupled by a network backbone 108. The inventory server 102, recognition library database 104, and managed devices 106 may provide a user interface (for example, display monitor, keyboard, mouse, etc.) to facilitate an administrator or user to store and utilize the application inventory system. Moreover, as can be appreciated, the server 102, library database 104, and managed devices 106 will generally include the computational power, such as a processor, to operate the various functions of the application inventory system. Lastly, it should be noted that the system 100 can be more complex than depicted, such as having sub branches with additional devices, connections to an external network such as the internet, and so on. Further, the system 100 could be, for example, a user or provider system, a datacenter, and so forth.

Reliable software application information may be beneficial for performing successful network or datacenter consolidation projects, confirming software license compliance and reconciliation, supporting asset management functions, as well as for providing useful information for technical support and maintenance, and so forth. Commonly, an increasing share of IT fiscal budgets is spent on software. Moreover, software publishers may audit their customer's software environments. Penalties for failing the audit are frequently severe, so it is beneficial to possess accurate software inventory.

While it may be traditionally relatively easy to discover certain software application information, it has been difficult to identify applications reliably in a normalized form, as discussed in greater detail below. For example, the information displayed by the Windows operating system in "Control Panel>Add or Remove programs" ("Programs and Features" on Windows Vista/Server 2008) is not normalized, and some details, such as publisher and version may be missing for many entries. In some cases, the software has been removed, but the entry might still be displayed, and also, many applications choose not to register in that list.

To overcome these problems, advanced software inventory products may employ a library of application signatures to identify the applications, typically based on the file information for the files that make up the software application. However, maintaining such a library with up-to-date information for all mainstream applications typically requires a lot of time and effort. Conventionally, in order to create the application signature, one generally had to study the application, understand its component structure, install the application, figure out which files belong to which component and add information about them to the library. As discussed later, in exemplary embodiments of the present invention increase the productivity of the application library development while still maintaining accuracy.

Current inventory approaches, for example, using DDM Inventory, collect the software inventory that includes information on all executable files. The software recognition process may then occur on an Inventory server (for example, DDM Inventory server). In other embodiments, the inventory may take place on the machine being inventoried. In certain instances, the inventory is conducted on three levels including file, directory, and machine. For file identification, different file attributes may be used, such as file name, size, signature, executable type, version data, etc. At each level the recognition algorithm generally attempts to create a list of possible application versions a file can belong to and, then, at the end of each level, the algorithm accounts for most or all of the files and identifies the application that has the best match to the file data observed. The algorithm may consider key executable files for identification of application installations, and other executable files may also count towards the recognition rating of an application. As the result of this technique, a normalized list of installed applications may be obtained. Normalized data representation is beneficial for IT Asset Management for representing data in a consistent and reliable way.

Table 1 shows an example of normalized and non-normalized publisher information on Adobe/Macromedia. All items such as publisher, application, release, version, operating system, language, file, etc. in the application library generally have an unique integer identifier (ID) associated with them. Once issued, this ID typically does not change. On rare occasions, the string representation might change (for example when one company buys another company—see the example of Macromedia in Table 1), but the ID of the item generally stays the same. This facilitates establishing reliable mapping for recognized application information to other products and externals systems. The software application library can serve as a catalog for the software asset management purposes. The library also supports the concept of software suites, where one application (umbrella version) covers the license of the components that are included in the suite, which allows for accurate suite license count to be obtained.

TABLE 1

Normalized and non-normalized data comparison.

| Normalized Format | Non-normalized Format |
| --- | --- |
| Adobe | Adobe Systems |
| Adobe (Macromedia) | Adobe Systems, Inc. |
|  | Adobe Systems Incorporated |
|  | Macromedia, Inc. |
|  | http://www.adobe.com |

Advantageously, a side product of the recognition process may be a list of unrecognized files. Thus, the end-user may determine which files are still not recognized and work towards improving the application identification by covering these yet unknown files. However, the amount of work to keep the library up to date, especially on various UNIX platforms, for example, is very high. For instance, Red Hat Enterprise Linux (RHEL) 4 operating system contains about 1100 different packages with executable content. Adding these 1100 packages manually to the library would be time consuming. Adding various updates regularly issued to address vulnerability and other problems, also increases the size of the application library significantly and associated entry time. Conventionally, each package typically needed to be classified to determine its publisher, application, release, version, and detailed file information about the files needs to be collected.

In exemplary embodiments of the present invention, a solution includes making use of the native operating system package managers to retrieve the relationship between installed packages and files, and to normalize the resulting data by tying it to the application library by means of flexible rules. Inventory techniques such as DDM typically collect the information about installed packages, but the file relationship information may be missing. In exemplary embodiments of the present invention, the inventory of the installed packages may be enhanced to collect the file relationship information. For example, on Linux with an RPM package manager the following command can be used to retrieve such a relationship from the RPM package manager: rpm qf'#\n%{name}\n%{version}\n%{vendor}\n%{size}\n%{summary}\n'—qla. The information returned from the RPM package manager by this command may be captured and analyzed to obtain the file relationship information. More details for other operating systems and package formats can also be found from the package managers for the respective operating systems. For example, in Solaris the command may be pkgchk, in HP-UX the command may be swlist, and in AIX the command may be lslpp. On some platforms, such as Windows, there are no system command line utilities available that can supply this information, but the MSI (Microsoft installer) API may be used to retrieve this information.

Once it is known what files belong to which packages, this information can be used during application recognition, but the data generally should be normalized. Accordingly, rules may be used to match various package properties, such as its type, name, version, release, etc., to the normalized representation in the application library.

In an exemplary embodiment of the present invention, rules form part of an application, for example, each application in the library can have one or more rules associated with it. The library is organized in a hierarchical structure. At a top level there are publishers, then applications, then releases, versions and finally file details for all files that are included in each version. Rules are created for an application, thus, the rule already belongs to a publisher and application. Therefore, to classify an application in a normalized form, the rule supplies information concerning an application's release and version. For example, to normalize the representation of the Firefox package, a rule that belongs to the publisher Mozilla Foundation and application Firefox is triggered. The rule matches if a package named "Firefox" is found having a type RPM and a version property that matches the following regular expression: ^((\d+).+). If the rule matches, the release of the application is obtained from the version property as discussed further below, and the version of the application is obtained from the version property.

After the rule has matched a package to a particular application, regular expressions forming the rule may be used to extract the release and version of the application from various package properties. Then, after the normalized representation of the application is known, the representation may be looked up in the application library. If found, the representation is correlated to represent the application. If not found, such a release and version may be created or automatically created in a user-maintained application library, for example. Files that were installed from the matched package may be marked as being recognized belonging to this application. This process can be illustrated by the following example of the Firefox browser package coming as part of the RHEL 4.7. Table 2 shows some properties detected for the Firefox package in this example.

TABLE 2

Properties detected for the Firefox package.

| Property | Value |
|---|---|
| name | Firefox |
| version | 3.0.1 |
| summary | Mozilla Firefox Web browser |

In this example, in order to obtain the normalized representation of this application, a rule is stored in library belonging to the application "Firefox" located in the "Mozilla" publisher. The rule may be triggered with the match on the package name (Firefox) and the string "Mozilla Firefox" being part of the package's description. This facilitates that the package corresponds to the Mozilla Firefox Web Browser. In Linux, the release name of the application may be obtained by applying the following regular expression to the version property of the package: ^(\d+). This expression extracts the leading digits, giving the release name of "3". The application version name is extracted from the version property with typically no regular expressions applied, which gives the version of "3.0.1".

So when performing application recognition, if the recognition process finds that the inventoried computer has package Firefox of type RPM installed and its version (in our example 3.0.1) matches the above regular expression—the rule matches and the release of that application will be 3 and version 3.0.1. Thus, a normalized representation is obtained for this application version, for example, Publisher: Mozilla Foundation, Application: Firefox. Release: 3, version: 3.0.1. After that all files belonging to this package that are found in the software inventory for this computer will be recognized as belonging to the above application version.

The general approach of this specific example may have various benefits. For instance, it is generally much faster to create rules to recognize an application than manually adding details for an application. Further, the same rule can be used to recognize many versions of the same application provided its packages follow the naming convention covered by the rule's regular expressions. In addition, for applications that are packaged, it may not necessary to add file data to the library. File data is commonly by far the largest contributor to the amount of memory consumed by the library during recognition process. Thus, in all, the amount of memory utilized and the time it takes to conduct application recognition is generally reduced. Moreover, it should be noted that some applications (for example, MySQL) are available in multiple installation formats, for example, as RPM package as well as an unpackaged tar ball file. The above mentioned rules and file relationship information facilitates the creation of the automated process of adding file information for such packaged applications to the library. Thus, the applications can typically be recognized even if an unpackaged form (such as tar) is used to install the application.

Lastly, there are a number of techniques for software discovery. Some approaches deliver the application library to each managed computer and perform the recognition on each managed computer. Because the inventory product should keep the footprint as low as possible, such tactics may only be beneficial when the library size is relatively small. Thus, the library typically would contain the information on key files of the application only. As can be appreciated, this approach may limit the accuracy of the application recognition. Other approaches include the creation of custom patterns/scripts that can run and identify applications based on the list of running processes, TCP/IP ports utilized, output of certain system command line utilities, etc. Unfortunately, these approaches generally only allow the product to identify known applications. Moreover, it is typically not possible to analyze those applications of which the library has no knowledge.

In contrast, an advantage of exemplary embodiments of the present invention using file-based software recognition is that it records the information on generally all executable files, not just key files, which results in more accurate recognition of applications which are in the library. It also facilitates the analysis of the remaining unrecognized files to determine what other applications are not yet recognized and uses the supplied tools to add them to the library to enhance coverage. The combination of package/file relationship coupled with data normalization using the application library and rules makes the present technique unique. Packaged applications are typically handled in a faster and simpler way, increasing the recognition coverage and leaving fewer unrecognized files to be analyzed. Exemplary embodiments of the present invention may support mainstream UNIX platforms and package formats, and other platforms including standard packages, such as Debian on Linux and Microsoft Installer (MSI) on Windows. The application library may be maintained to add new rules to cover recently discovered packages on the currently supported platforms.

Figure 2:
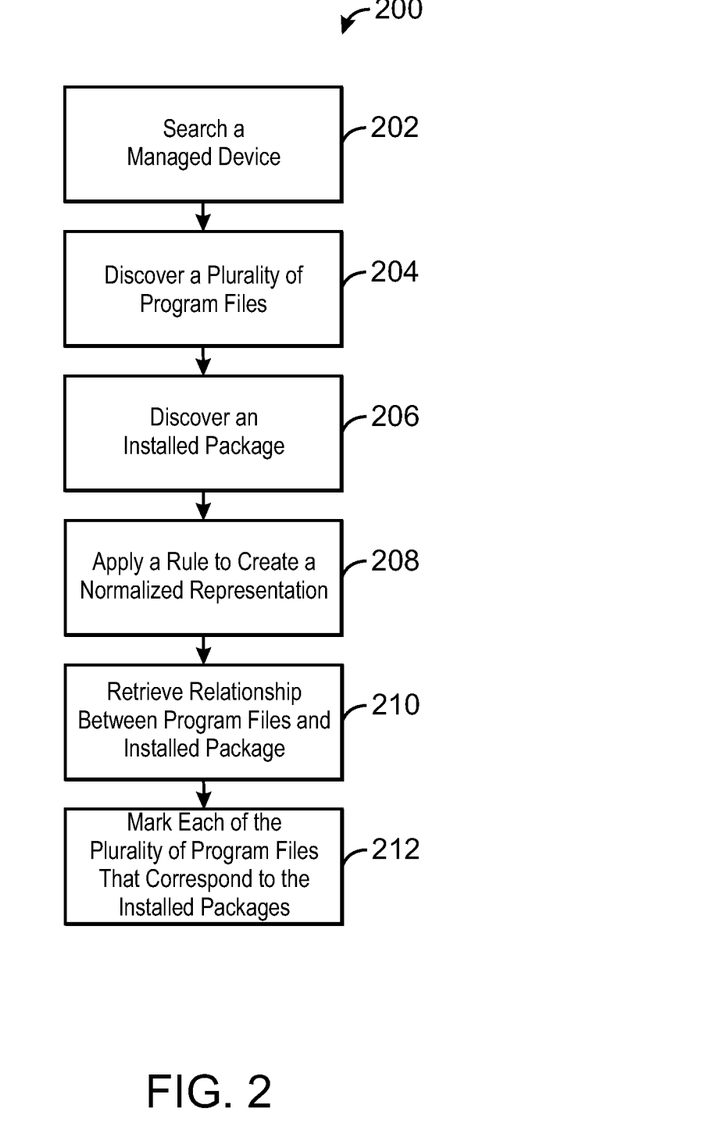
FIG. 2 is a process flow diagram of a method of inventorying application files in a computer network in accordance with an exemplary embodiment of the present invention.

FIG. 2 is a method 200 for application inventory of a computer, network, or datacenter, such as the network system 100 of FIG. 1, in accordance with an exemplary embodiment of the present invention. The functions of the method 200 may be implemented via a computer processor and may include hardware or software modules. Initially, the method 200 provides for searching managed devices, such as computers or servers in a network or datacenter, to discover program files that may belong to an application on the managed devices (blocks 202 and 204). Installed packages that may belong to particular applications are also discovered (block 206). A rule or rules may be used to normalize the representation of the installed packages (block 208), as discussed herein. If a rule does not exist for normalizing the representation of the installed package, a rule may be automatically or manually created. If a rule cannot be created, the particular program files are marked for later identification from a list of installed applications. The discovered program files may be identified and associated with an application, such as through identification information stored in an application and file library database. In certain instances, as indicated, native package managers may be used to facilitate retrieval of the relationship between installed application packages and the discovered files (210). The program files that belong to a particular installed package may then be stored or marked (212).

Exemplary package managers include Microsoft Installer for Windows, RPM Package manager for Linux/AIX/UNIX, Pkg package manager on Solaris, Pkg package manager on Mac OS X, Depot package manager on HP-UX, BFF package manager on AIX, and DEB package manager on Debian derived LINUX. As appreciated by the skilled artisan, standard packages are usually annotated with a set of package properties, which generally contain the following pieces of information: the software name; the software version; and the package release (the number of times the package has been rebuilt using the same version of the software). This field may be also used to indicate the specific distribution of the package by appending strings. The architecture the package was built for (i386, i686, Athlon, etc.) may be subsequently noted.

After utilizing the native package manager or other information to associate the discovered file with an application, the method 200 then checks a memory device, such as the library database, to retrieve a rule to be employed with the identified application (decision block 210). If a relevant rule is found, the rule is applied (block 212) to provide normalized application file data 214. If a relevant rule is not currently stored, then a rule is manually or automatically added (stored) to the memory device, such as to the library database (block 216). Thereafter, the rule is applied to provide the normalized file data 214.

In employment of the rules, regular expressions forming the rule are used to extract the release and version of the application from various package properties. Then, after the normalized representation of the application is known, the representation may be looked up in the application library database. If found, the representation is correlated to represent the application. If not found, such a release and version may be created or automatically created in a special user maintained application library. In either case, files that were installed from the matched package may be marked as being recognized belonging to this application (block 218).

In sum, the package list is obtained including the correlation between packages and files that were installed from them. Rules are applied to obtain package information matched in a normalized form. Moreover, results are tied with file based recognition to determined what applications are installed that were not packaged using a standard package format. However, beneficially, the technique may not have to evaluate the library for applications packaged in the standard format when installed in the network because the files are typically already recognized. Moreover, it should be apparent that rules for packages from standard operating systems, or other commercially available mainstream software, may be created during the provider development phase. In other words, such rules may be provided out of the box as part of a master application library, for example. In addition, users or customers can add rules in an application library for in-house developed applications, for example, and so forth.

The creator of the package generally follows a certain naming convention for its version. Thus, creating a rule that extracts the relevant parts of package properties with a regular expression will typically work for different versions of the application, producing relatively consistent results. For example, the Firefox RPM package may follow a convention wherein the version property of the package contains Major.Minor.MinorMinor. Therefore, a rule may be implemented that takes the leading digits of the version property (as the release name of the product), and then takes the three digit groups separated with dots from the version property and uses it as a version name representation, as denoted in Table 3.

TABLE 3

| Version Property (input from the installed package) | Release Name (placed into the normalized application library) | Version Name (placed into the normalized application library) |
|---|---|---|
| 1.0.0 | 1 | 1.0.0 |
| 1.05 | 1 | 1.0.5 |
| 2.0.0 | 2 | 2.0.0 |
| 3.05 | 3 | 3.0.5 |

As long as the packager keeps the same or similar naming convention, the rule will typically match different versions of the same application. If the packager uses a different naming convention for version, such as using a different property or format for storing information, etc., the current regular expressions of the rule may not match. Thus, the rule may be amended to make the regular expression more generic, for example, so it covers the new naming convention. Alternatively, a different rule may be created that follows the new naming convention.

Figure 3:
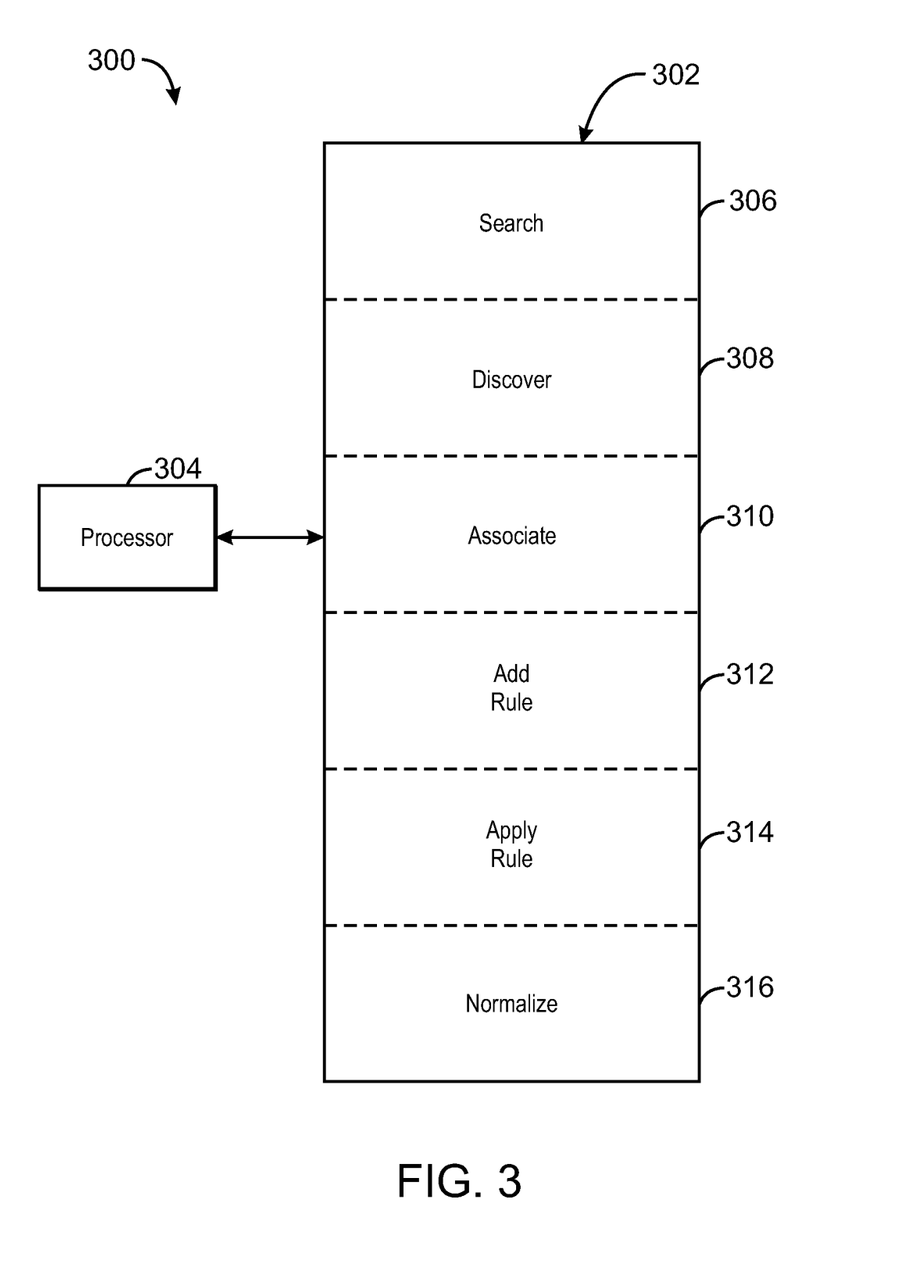
FIG. 3 is a diagrammatical representation of an inventory server and associated library in accordance with an exemplary embodiment of the present invention.

FIG. 3 is a system 300 having tangible machine-readable media 302 coupled with a processor 304, in accordance with an exemplary embodiment of the present invention. The machine-readable media 302 have computer-executable code stored thereon for execution (for example, via the processor 304) for identification of application program files, in accordance with an exemplary embodiment of the present invention.

Software modules stored in the memory 302 may include code for exemplary embodiments of the present invention, such as a module 306 for searching managed devices in a network or datacenter for application program files, a module 308 for discovering the files, and a module 310 for associating such files with an application, as discussed above. The software modules stored in the memory 302 may also include a module 312 for adding rules via the processor 304 to a memory device, such as to a file/rule library database. The modules include modules 314 and 316 for applying existing or newly-added rules to provide normalized application file data, as discussed. Examples of machine-readable media 302 that may be used in exemplary embodiments of the present invention include hard drives, optical drives, flash drives, ROM, RAM, drive arrays, and the like.

EXAMPLE

An exemplary embodiment of the present invention was tested by inventorying a system with Red Hot Enterprise Linux (RHEL) 4. Initially, however, it should be noted that similar examples could also be conducted with rules to covering RHEL 3 and 5, as well as other Linux and UNIX operating systems, and so on. In all, the inclusion of this capability may dramatically improve the application coverage on UNIX platforms, other platforms, and so on.

In the present example, by creating the rules for the RHEL 4, 1400 different applications were recognized for different updates of the operating system. In this example, with traditional approaches, the details of around 31,000 files would have typically been recorded in the library. With the new approach of the exemplary embodiment of the present invention to the present example, the addition of these 31,000 is generally no longer required. Experience showed that on average it takes around 5-12 minutes to create a rule. As discussed above, the rule will be recognizing different versions of applications, including future versions, while a "traditional" process requires manual updating of the library with file details of all application versions that it needs to recognize. As can be appreciated, this is significant improvement over a manual process.

What is claimed is:

1. A method to inventory program files, comprising:
searching a managed device in a computer network;
discovering a plurality of program files on the managed device;
discovering an installed package relating to an application on the managed device;
applying a rule to package properties of the installed package to create a normalized representation of the installed package;
retrieving a relationship between the installed package and the plurality of program files based on the normalized representation of the installed package; and
marking the plurality of program files as belonging to the application based on the relationship between the installed package and the plurality of program files.

2. The method of claim 1, wherein applying the rule to the package properties comprises applying the rule to the package properties that comprise at least one selected from among: a type of the application, a name of the application, a version of the application, and a release of the installed package.

3. The method of claim 1, further comprising generating the rule to create the normalized representation of the installed package in response to determining that no rule is present.

4. The method of claim 1, wherein applying the rule comprises extracting a release and a version of the application from the package properties.

5. The method of claim 4, wherein the normalized representation is created using the extracted release and version of the application.

6. The method of claim 1, wherein retrieving the relationship is performed by an operating system package manager.

7. The method of claim 1, further comprising looking up the normalized representation in an application library.

8. The method of claim 1, further comprising storing the normalized representation in a library.

9. The method of claim 1, further comprising comparing a program file that does not correspond to an installed package to a database of applications.

10. A computer system comprising:
at least one processor; and
a storage medium to store code executable on the at least one processor to:
search a managed device in a computer network;
discover a plurality of program files on the managed device;
discover an installed package relating to an application on the managed device;
apply a rule to package properties of the installed package to create a normalized representation of the installed package;
retrieve a relationship between the installed package and the plurality of program files based on the normalized representation of the installed package; and
mark the plurality of program files as belonging to the application based on the relationship between the installed package and the plurality of program files.

11. The computer system of claim 10, wherein the package properties comprise at least one selected from among: a type of the application, a name of the application, a version of the application, and a release of the installed package.

12. The computer system of claim 10, wherein the code is executable on the at least one processor to further generate the rule to create the normalized representation of the installed package in response to determining that no rule is present.

13. The computer system of claim 10, wherein the applying of the rule causes extraction of a release and a version of the application from the package properties.

14. The computer system of claim 13, wherein the normalized representation comprises the extracted release and version of the application.

15. The computer system of claim 10, further comprising an operating system package manager to retrieve the relationship based on the normalized representation of the installed package.

16. The computer system of claim 10, further comprising a library to store the normalized representation.

17. The computer system of claim 10, wherein the managed device runs a Windows operating system, a Linux operating system, a Unix operating system, a Mac operating system, an HP-UX operating system, or any combination thereof.

18. A non-transitory computer-readable storage medium storing code that upon execution cause a system to:
search a managed device in a computer network;
discover a plurality of program files on the managed device;
discover an installed package relating to an application on the managed device;
apply a rule to package properties of the installed package to create a normalized representation of the installed package;
retrieve a relationship between the installed package and the plurality of program files based on the normalized representation of the installed package; and
mark the plurality of program files as belonging to the application based on the relationship between the installed package and the plurality of program files.

19. The non-transitory computer-readable storage medium of claim 18, wherein the rule is associated with the application, and wherein different rules are associated with different applications.

20. The non-transitory computer-readable storage medium of claim 18, wherein the applying of the rule causes extraction of a release and a version of the application from the package properties, and wherein the normalized representation comprises the extracted release and version of the application.

\* \* \* \* \*